United States Patent [19]

Perlin

[11] Patent Number: 5,764,794
[45] Date of Patent: Jun. 9, 1998

[54] METHOD AND APPARATUS FOR ELECTRONICALLY STORING ALPHANUMERIC CHARACTERS

[76] Inventor: Kenneth Perlin, 7-13 Washington Square North, Apt. 31B, New York, N.Y. 10003

[21] Appl. No.: 662,976

[22] Filed: Jun. 13, 1996

Related U.S. Application Data

[63] Continuation of Ser. No. 511,001, Aug. 3, 1995, abandoned, which is a continuation of Ser. No. 143,875, Oct. 27, 1993, abandoned.

[51] Int. Cl.$^6$ .............................. G06K 9/18; G06K 9/00
[52] U.S. Cl. ...................... 382/186; 382/187; 345/179
[58] Field of Search .................................. 382/182, 185, 382/186–189, 313–315; 364/705.03, 709.11, 709.01, 236.8, 237.1; 345/163, 179, 180, 181, 182, 183, 175

[56] References Cited

U.S. PATENT DOCUMENTS

| | | | |
|---|---|---|---|
| 4,542,526 | 9/1985 | Satoh et al. | 382/13 |
| 4,764,972 | 8/1988 | Yoshida et al. | 382/13 |
| 4,905,007 | 2/1990 | Rohm | 345/179 |
| 4,985,929 | 1/1991 | Tsuyama | 382/13 |
| 5,220,649 | 6/1993 | Forcier | 395/148 |
| 5,596,656 | 1/1997 | Goldberg | 382/186 |
| 5,615,283 | 3/1997 | Donchin | 382/187 |

OTHER PUBLICATIONS

ORGANEK Technology Brochure, 1992. "Penput™–Beyond Character Recognition!".

Charles C. Tappart et al. "The State of the Art in On–Line Handwriting Recognition", IEEE Transactions on Pattern Analysis & Machine Intelligence, V12 No. 8, Aug. 1990, pp. 787–808.

Robert M. Carr, "Handwriting Recognition in the GO Operating System" COMPCON Spring '91 Digest (cat #91CH2961-1) pp. 483-486.

Goldberg et al. "Touch Typing with a Stylus", Conf. on Human Factors in Computing Systems Apr. '93.

*Primary Examiner*—Leo Boudreau
*Assistant Examiner*—Bhavesh Mehta

[57] ABSTRACT

The present invention pertains to an apparatus for electronically storing alphanumeric characters. The apparatus comprises a computer having a memory. The apparatus also comprises a pointing device electrically connected to the computer which serves as a virtual keyboard. Furthermore, the apparatus comprises means for encoding words with alphanumeric characters with a gesture language which is drawn by the pointing device on a surface without the pointing device having to be lifted from the surface. The encoding means is disposed in the memory. The present invention also pertains to a method for electrically storing alphanumeric characters. The method comprises the steps of a) positioning a pointing device electrically connected to a computer to a relative origin on a surface. Next, there is the step b) of moving the pointing device to a predetermined position relative to the origin in a predetermined motion along the surface while maintaining contact with the surface the entire time. Then there is the step c) of returning the pointing device to the origin along the surface while maintaining contact with the surface the entire time. Next there is the step of repeating steps b) and c) without the pointing device ever losing contact with the surface.

5 Claims, 4 Drawing Sheets

METHOD AND APPARATUS FOR ELECTRONICALLY STORING ALPHANUMERIC CHARACTERS

This application is a continuation of application Ser. No. 08/511,001 filed on Aug. 3, 1995, now abandoned, which is a continuation of application Ser. No. 08/143,875 filed on Oct. 27, 1993, now abandoned.

FIELD OF THE INVENTION

The present invention pertains to a method and apparatus for electronically storing alphanumeric characters. More specifically, the present invention is related to an apparatus for electrically storing alphanumeric characters so words are encoded with a gesture language which is drawn by a pointing device on a surface without the pointing device ever having to be lifted from the surface.

BACKGROUND OF THE INVENTION

The typewriter keyboard was invented to allow people to put text on paper more quickly than is possible by writing with a pen.

In recent decades typing has become adopted primarily for text entry into a computer. The text may then be printed out, or processed in some way.

Recently pen based computers have become popular, thereby allowing the operation of a computer in situations where the relatively large size of a keyboard would be inconvenient. These computers recognize writing either by a character recognition algorithm, or by allowing the user to point successively at letters on a screen image of a keyboard.

Here is the problem: A pen based computer has no keyboard. People are not able to enter text quickly and simply.

Prior methods for entering text on a pen-based computer fall into two categories:

(1) present an image of a keyboard, and have the user poke at each character, one at a time.

(2) have the user write in block or cursive do a stroke by stroke analysis. A database is developed for each individual user's "style" in order to reduce errors.

The Apple Newton®, for example, uses both of the above methods, the first to build up a dictionary of frequently used words, then the second to enter text. Both methods are slow (particularly the first), while the second is conspicuously error prone.

These prior methods require the user to look at the text being entered on the screen. They offer no practical way to look at, and therefore to copy, source text from hand-written notes or books, as is commonly done using typewriter keyboards.

Entering text on pen based computers is many times slower than is typing on a keyboard. This renders pen based computers disadvantageous in many situations.

The proposed invention permits text entry on a pen based computer at speeds comparable to typing on a keyboard.

SUMMARY OF THE INVENTION

The present invention pertains to an apparatus for electronically storing alphanumeric characters. The apparatus comprises a computer having a memory. The apparatus also comprises a pointing device electrically connected to the computer which serves as a virtual keyboard. Furthermore, the apparatus comprises means for encoding words with alphanumeric characters with a gesture language which is drawn by the pointing device on a surface without the pointing device having to be lifted from the surface. The encoding means is disposed in the memory.

The present invention also pertains to a method for electrically storing alphanumeric characters. The method comprises the steps of a) positioning a pointing device electrically connected to a computer to a relative origin on a surface. Next, there is the step b) of moving the pointing device to a predetermined position relative to the origin in a predetermined motion along the surface while maintaining contact with the surface the entire time. Then there is the step c) of returning the pointing device to the origin along the surface while maintaining contact with the surface the entire time. Next there is the step of repeating steps b) and c) without the pointing device ever losing contact with the surface.

BRIEF DESCRIPTION OF THE DRAWINGS

In the accompanying drawings, the preferred embodiment of the invention and preferred methods of practicing the invention are illustrated in which.

DESCRIPTION OF THE PREFERRED EMBODIMENT

Figure 5:
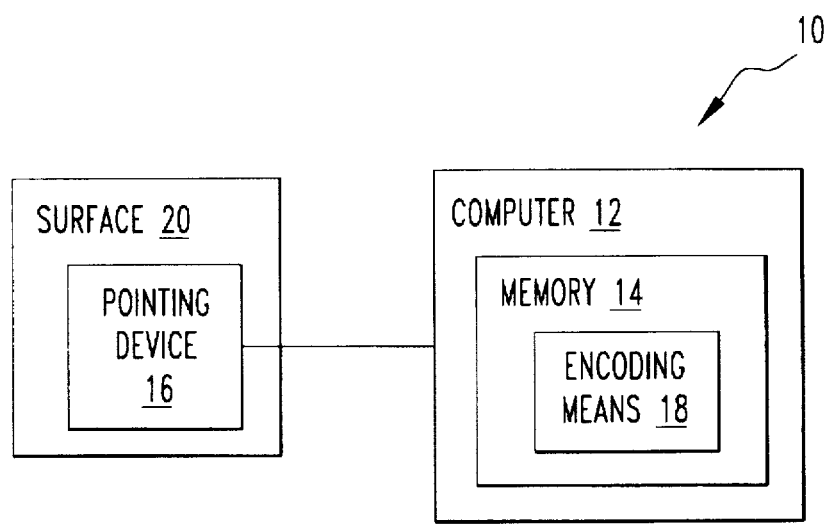
FIG. 5 is a schematic representation of the present invention.

Referring now to the drawings wherein like reference numerals refer to similar or identical parts throughout the several views, and more specifically to FIG. 5 thereof, there is shown a schematic representation of an apparatus 10 for electronically storing alphanumeric characters. The apparatus 10 comprises a computer 12 having a memory 14. The apparatus 10 also comprises a pointing device 16 electrically connected to the computer 12 which serves as a virtual keyboard. Additionally, the apparatus 10 comprises means 18 for encoding words with alphanumeric characters with a gesture language which is drawn by the pointing device 16 on a surface 20 without the pointing device 16 having to be lifted from the surface 20. The encoding means 18 is disposed in the memory 16.

The present invention also pertains to a method for electronically storing alphanumeric characters. The method comprises the steps of a) positioning a pointing device 16 electrically connected to a computer 12 to a relative origin on a surface 20. Next there is the step b) of moving the pointing device 16 to a predetermined position relative to the origin and a predetermined motion along the surface 20 while maintaining contact with the surface 20 the entire time. Next there is the step c) of returning the pointing device 16 to the origin along the surface 20 while maintaining contact with the surface 20 the entire time. Then there is the step d) of repeating steps b) and c) without the pointing device 16 ever losing contact with the surface 20.

Preferably, the positioning step includes the step of placing the pointing device 16 in a still position to define the origin. Preferably, the moving step includes the step of moving the pointing device 16 to a predetermined position on a bi-layer concentric circle 22 about the origin in a predetermined motion. The positioning step also can include the step of clicking the pointing device 16 so the alphanumeric character drawn is capitalized. Additionally, after the step d), there can be the step of lifting the pointing device 16 off of the surface 20 to encode a space.

In the operation of the preferred embodiment, a pointing device 16 such as a computer pen is used as a "virtual keyboard". The pointing device can be any absolute positioning device, such as a touch screen, touch pad, or tablet/stylus, or alternatively any relative positioning device, such as a mouse or joystick or trackball. In contrast to traditional shorthand, this does not require making recognizable marks on paper. It only requires making computer-recognizable gestures with the pen. See Human-Computer Interaction by Baecker and Buxton, (Morgan-Kaufman, 1987) which contains a discussion of clicking-type interactions in an included paper entitled "Issues and Techniques in Touch-Sensitive Table Input" on pages 376–384, incorporated by reference, for a more complete discussion of character and gesture recognition on pages 670–672. This enables the following property: Every character is "drawn" with a gesture that begins at the same place in which it starts. Such a gesture is referred to as a "loop". The advantage to the user of using loops is that the hand holding the pen does not need to travel over the surface. Because the hand does not need to move, character entry is very fast.

The encoding means 18 preferably includes a set of algorithms stored in the memory 14 of the computer 12 which allows it to recognize a large set of simple and distinct loops, each representing a single character. By clicking one or more times prior to drawing a loop, the user can further specify that a loop represents a character in an alternate character set, such as capital letters, control characters, etc. Special sequences provide the equivalent of caps-lock or numeric-lock keys. By "clicking" is meant the standard operation that is defined by either:

(1) when using a mouse or joystick or trackball or tablet stylus that has a button, pressing and then releasing this button.

(2) when using a touch sensitive surface or a pressure sensitive tablet, pushing down the finger or stylus tip, and then immediately releasing this pressure. Note that this works even when the input device detects only two levels of pressure (on or off). See Human-Computer Interaction by Baecker and Buxton, (Morgan-Kaufman, 1987) which contains a discussion of clicking-type interactions in an included paper entitled "Issues and Techniques in Touch-Sensitive Table Input" on pages 376–384, incorporated by reference.

Figure 1A:
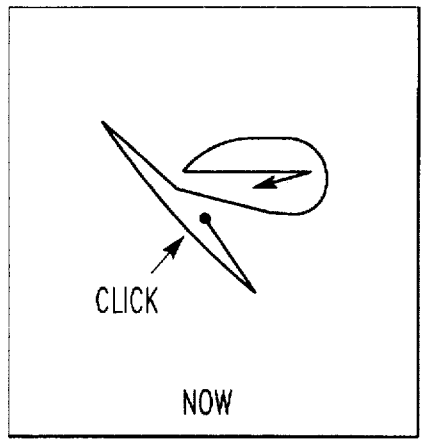
FIGS. 1a–1d are tracings of a pen tip of the present invention.
Figure 1B:
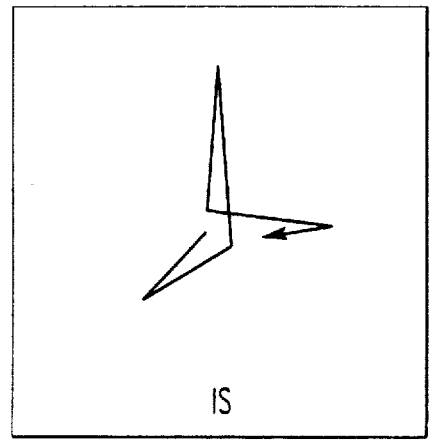
Figure 1D:
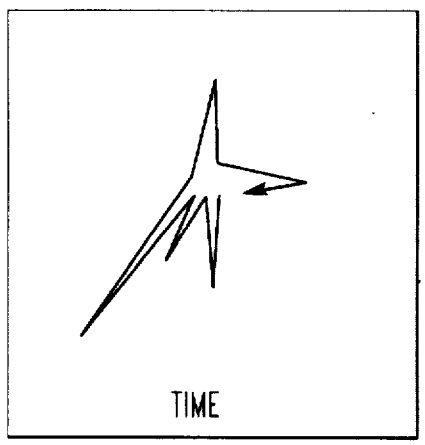
Figure 1C:
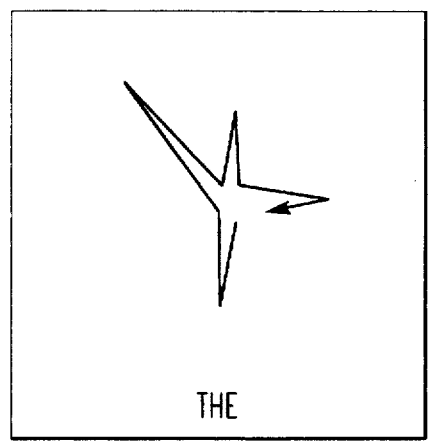
Figure 2:
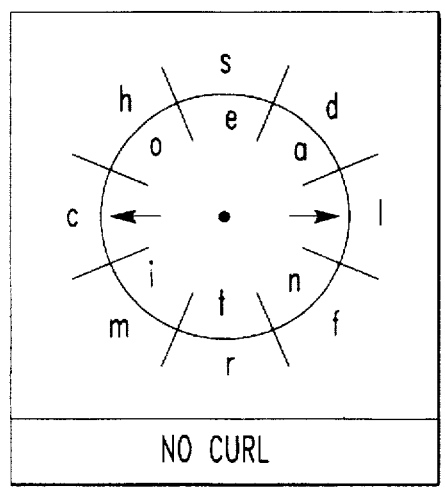
FIG. 2 is a gesture to character map of the present invention with no curl.
Figure 3:
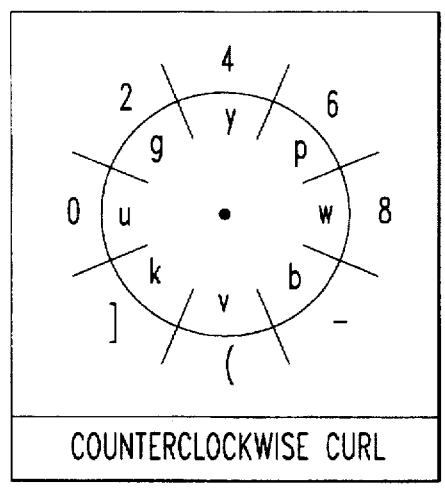
FIG. 3 is a gesture to character map of the present invention showing counterclockwise curl.
Figure 4:
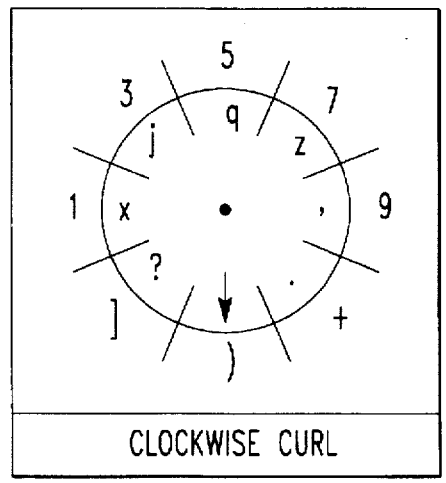
FIG. 4 is a gesture to character map of the present invention showing clockwise curl.

With reference to FIGS. 2–4, the active area in which a loop is formed is structured into two concentric circles 22. The inner circle is of radius R=¼ inch. This can be varied for different hand sizes and writing styles. The outer circle is of radius 3R.

A loop occurs when the user has successively:

(1) moved the pen position away from the loop starting point by more then R, then (2) returned the pen to less than ½ of its farthest distance from the starting point.

Once a loop has been drawn, the algorithm parses it by various characteristics.

The algorithm can recognize 144 distinct characters, by checking the following characteristics for a loop:

(1) number of clicks preceding the loop: 0, 1, . . .

(2) loop direction: East, West, North, South, NE, SE, SW, NW (3) loop length: short or long (4) loop curl: clockwise (cw), counterclockwise (ccw), or none This gives 3×8×2×3=144 distinguishable loops.

These characteristics may be mapped into a character set in many different ways. In practice, some loops are much faster to draw than others. For example, the 8 fastest loops are short loops with no clicking and no curl, followed by long loops with no clicking and no curl. For this reason, the fastest loops are mapped into the most frequently used characters. Following is the mapping used in the current implementation. The invention is not restricted to this particular mapping; it is only one example of many possible mappings:

Loops preceded by no clicks:

|  |  | Direction: | | | | | | | |
|---|---|---|---|---|---|---|---|---|---|
| CURL | LENGTH | East | NE | North | NW | West | SW | South | SE |
| none | short | DELETE | o | e | a | SPACE | n | t | i |
| none | long | c | h | s | d | l | f | r | m |
| ccw | short | u | g | y | p | w | b | v | k |
| cw | short | x | j | q | z | , | . | RETURN | ? |
| ccw | long | 0 | 2 | 4 | 6 | 8 | – | ( | [ |
| cw | long | 1 | 3 | 5 | 7 | 9 | + | ) | ] |

Loops preceded by one click (capitals):
Direction: East NE North NW West SW South SE

|  |  | Direction: | | | | | | | |
|---|---|---|---|---|---|---|---|---|---|
| CURL | LENGTH | East | NE | North | NW | West | SW | South | SE |
| none | short | ESCAPE | O | E | A | TAB | N | T | I |
| none | long | C | H | S | D | L | F | R | M |
| ccw | short | U | G | Y | P | W | B | V | K |

| CURL | LENGTH | Direction: | | | | | | | |
|------|--------|------|----|-------|----|------|----|-------|----|
|      |        | East | NE | North | NW | West | SW | South | SE |
| cw   | short  | X    | J  | Q     | Z  | ;    | :  | '     | "  |
| ccw  | long   | \    | @  | $     | ^  | *    | −  | <     | {  |
| cw   | long   | !    | #  | %     | &  | /    | =  | >     | }  |

In addition to the above characters, unprintable characters and other character set extensions may be drawn by preceding a loop with two or more clicks. This allows for 48 more characters for each additional click.

The Algorithm

The algorithm consists of the following four part loop:

(1) Wait for a loop to begin, while counting clicks.
(2) Accumulate points, waiting for loop to end.
(3) Analyze loop to determine character.
(4) Output one character, and go to step (1).

Figure 6:
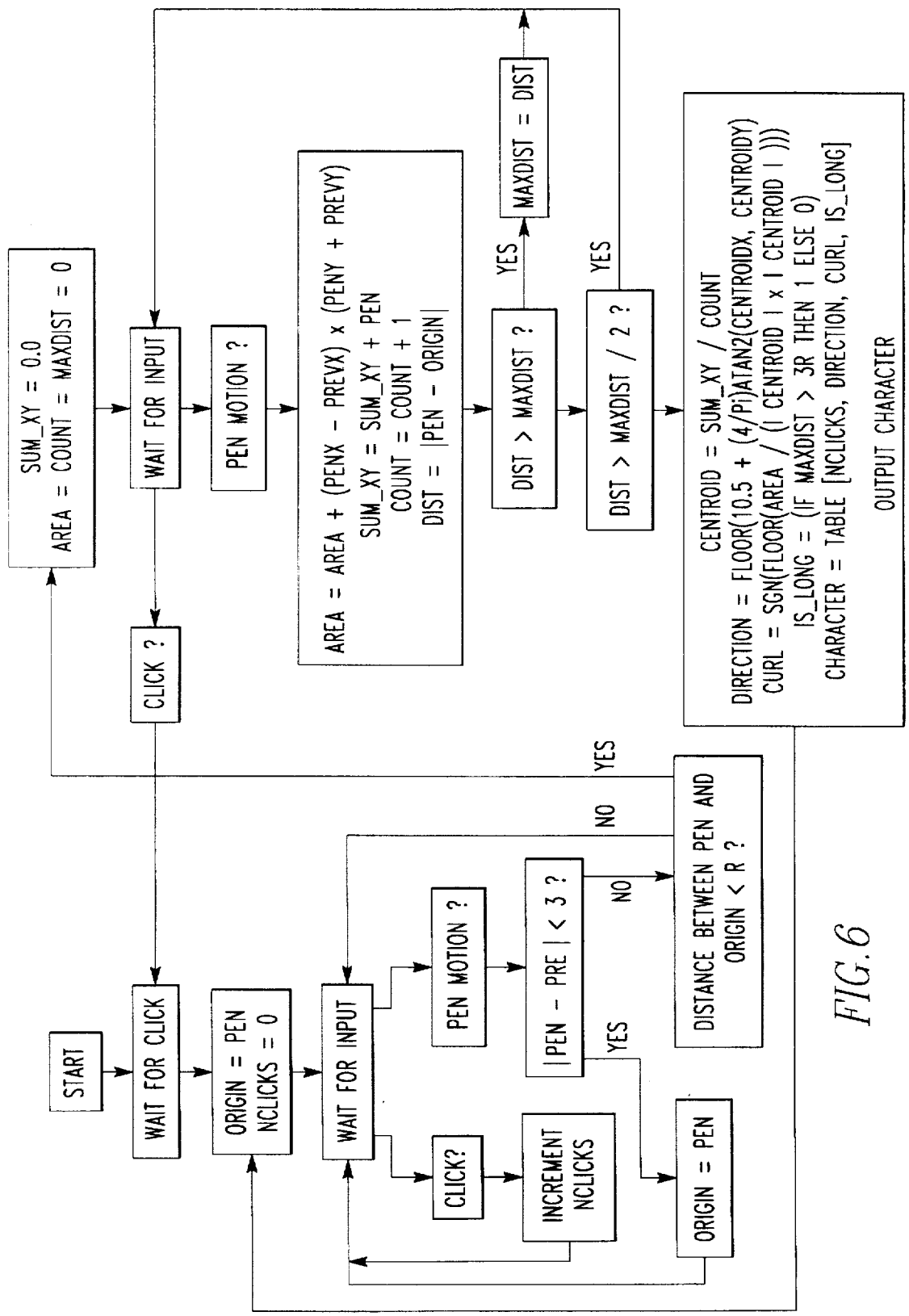
FIG. 6 is a flow chart of the present invention.

This algorithm is described in detail in the accompanying flow chart shown in FIG. 6.

Part 1—wait for loop to begin, and count clicks wait for an initial click to start the program.

(1.1)
   set origin equal to pen.
(1.2)
   set the nclicks counter to zero.
(1.3)
   wait for input
   if a click:
     increment the nclicks counter, go to step (1.3)
   if pen motion:
     [when the pen motion is very small, we only want to adjust the origin.]
     calculate distance squared between pen and prev.
     if this value is less than 9, then:
       set origin equal to pen, go to step (1.3)
     calculate distance squared between pen and origin.
     if this distance is less than R^2, then go back to step (1.3).
   [otherwise, begin drawing the loop.]

Part 2—draw the loop, accumulate info
   sum_xy=0.0.
   set area, count, and maxdist2 to zero.
(2.1)
   wait for input
   if a click:
     [the user is clicking in order to abort the loop, so we must begin again.]
     go back to step (1.1).
   [add a trapezoidal sliver to the total area inside the loop.]
   increment area by (penx−prevx)x(peny+prevy). [keep summing pen positions, so we can later get the centroid position.]
   increment sum_xy by pen.
   increment count.
   if pen motion:
     calculate dist2=distance squared between pen and origin.
     if dist2 is greater than than maxdist2:
       [we are at the greatest distance so far from the origin.]
       set maxdist2 equal to dist2.
       go back to step (2.1).
     if dist2 is greater than maxdist2/4:
       [we have not yet returned far enough to complete the loop.]
       go back to step (2.1).

Part 3—calculate statistics and output a character.
   centroid=sum_xy/count.
   direction=floor (10.5+atan2(centroidx,centroidy)) modulo 8.
   [curl will be −1, 0, or +1].
   curl=sgn $\vartheta$ area/$\vartheta$ :centroid$\vartheta$ ^2 $\vartheta$.
   set is_long to 1 if maxdist^2>(3R)^2, otherwise to 0.
   [do a table look up, based on loop statistics.]
   character=table[nclicks, direction, curl, is_long].
   output character
   [go back to the beginning, to start recognizing the next character.]
   go back to step (1.2)

Before the loop actually begins, the speed at which the user moves the tablet pen is relevant. A loop begins if the user moves the pen quickly; slow pen movement just continually adjusts the center of the circle so that it follows the pen. This continual adjustment is important, so that the user doesn't need to look at the pen itself while "typing".

The algorithm recognizes two types of user input: (1) click, and (2) move the pen point. In either case, a variable pen is set that contains the x,y coordinates of the pen point. The previous pen position (before the latest motion) is referred to as prev. The origin is a variable that contains the x,y coordinates where the loop starts and ends. Explanatory comments will appear in square brackets.

An example of the invention in use, with reference to FIGS. 1a–1d, 2, 3 and 4, and a description of the user inputing the phrase "Now is the time" is now provided. Each of the user's successive actions is followed by a description of the computer's response.

The user CLICKS:

RESPONSE: The next printed character will be upper case.

The user makes a short stroke down-right, and then back again.

RESPONSE: The character 'N' is printed.

The user makes a short stroke up-left, and then back again.

RESPONSE: The character 'o' is printed.

The user makes a short counter-clockwise loop to the right.

RESPONSE: The character 'w' is printed. (See FIG. 1a.)

The user makes a short stroke to the right, and then back again.

RESPONSE: The space character is printed. (See FIG. 1a.)

The user makes a short stroke down-left, and then back again.

RESPONSE: The character 'i' is printed.
The user makes a long stroke up, and then back again.
RESPONSE: The character 's' is printed.
The user makes a short stroke to the right, and then back again. (See FIG. 1b.)
RESPONSE: The space character is printed. (See FIG. 1b.)
The user makes a short stroke down, and then back again.
RESPONSE: The character 't' is printed.
The user makes a long stroke up-left, and then back again.
RESPONSE: The character 'h' is printed.
The user makes a short stroke up, and then back again.
RESPONSE: The character 'e' is printed.
The user makes a short stroke to the right, and then back again.
RESPONSE: The space character is printed. (See FIG. 1c.)
The user makes a short stroke down, and then back again.
RESPONSE: The character 't' is printed.
The user makes a short stroke down-left, and then back again.
RESPONSE: The character 'i' is printed.
The user makes a long stroke down-left, and then back again.
RESPONSE: The character 'm' is printed.
The user makes a short stroke up, and then back again.
RESPONSE: The character 'e' is printed.
The user makes a short stroke to the right, and then back again.
RESPONSE: The space character is printed. (See FIG. 1d.)

Why would people want this invention:

Prior methods offer no way to accurately enter text on a pen based computer at speeds comparable to typing on a keyboard. The current invention provides a way to do this.

This also increases the power of other pen-based interactions. Pen/gesture/drawing based interactions can be very powerful and expressive. With this new innovation, the user does not need to put down the pen and position fingers on a keyboard, then pick up the pen again.

The method described here can easily be embedded in any currently existing or future pen-based standard software interface (such as PenPoint). A recognized gesture in the parent system puts the user into the "text mode" described by this invention, without having to relinquish the pen.

When finished entering text, the user enters a designated "control key" as described in this invention, to escape back to the parent system.

This escape is very fast, requiring at most two clicks and a small looping gesture.

Alternatively, the user can designate a specific "text entering region" on the computer screen. Gestures drawn within this region will be interpreted as text, as described in this invention.

New innovations of this invention:

The concept of allowing the user to enter text with a computer pen without having to look at the pen. The text being entered can appear anywhere on the screen; it does not have to appear at or near the pen tip.

The concept of entering a text character by using a short stylized gesture, which does not need to correspond to the physical appearance of the text character.

Existing methods for writing shorthand on paper (such as the Gregg and Pittman systems) require ink marks to be placed on the paper that can later be visually interpreted. The fact that a computer is actively interpreting the pen gestures removes this requirement. The text-specifying pen motion does not need to correspond to any readable set of marks on paper.

One innovation of this invention is the concept of specifying text with a pen in a way that has no ink-mark equivalent.

The concept of beginning and ending each drawn character at the same place, so that the hand does not need to move over the computer screen.

An algorithm to automatically adjust the center of interest as the user's pen tip drifts between character entries. This frees the user from having to track the pen position itself while entering text.

This allows the user to look at source text (say, notes on paper, or text being copied from a book), just as in touch typing on a conventional keyboard.

This mode of input is not possible using prior cursive entry methods. Using those methods, the pen would quickly run off the edge of the screen.

The concept of categorizing all of the possible fast, single strokes that are easy to distinguish, in order to create a character set representation. This includes looking at such characteristics as: (i) the 8 principle directions, (ii) short versus long stroke, (iii) hooking the stroke clockwise/counterclockwise/neither, (iv) number of clicks before each stroke.

Mapping the most rapidly drawn strokes into the most frequently used characters (to maximize speed of text entry).

Although the invention has been described in detail in the foregoing embodiments for the purpose of illustration, it is to be understood that such detail is solely for that purpose and that variations can be made therein by those skilled in the art without departing from the spirit and scope of the invention except as it may be described by the following claims.

What is claimed is:

1. An apparatus for electronically storing alphanumeric characters comprising:

a computer having a memory;

a pointing device electrically connected to the computer which serves as a virtual keyboard; and means for encoding words with alphanumeric characters which correspond to English language characters with a gesture language which is drawn by the pointing device on a surface without the pointing device being lifted from the surface, the pointing device moving one of two distinct lengths of stroke as measured from the origin to a predetermined position about the origin in a predetermined loop motion and the pointing device returning to a relative origin each time an alphanumeric character is drawn, said encoding means disposed in the memory and having special purpose recognition techniques that recognize the gesture language drawn by the pointing device from the predetermined loop motion based on number of clicks, directions, curvature and length of the loop motion.

2. A method for electronically storing alphanumeric characters comprising the steps of:

a) positioning a pointing device electrically connected to a computer to a relative origin on a surface;

b) moving the pointing device one of two distinct lengths of stroke as measured from the origin to a predetermined position relative to the origin in a predetermined loop motion along the surface while maintaining contact with the surface the entire time;

c) determining a corresponding alphanumeric character which corresponds to English language characters with a gesture language from the predetermined loop motion based on number of clicks, direction, curvature and length of the loop motion;

d) returning the pointing device to the origin along the surface while maintaining contact with the surface the entire time; and e) repeating steps b, c and d without the pointing device ever losing contact with the surface.

3. A method as described in claim 2 wherein the positioning step includes the step of placing the pointing device in a still position to define the origin.

4. A method as described in claim 2 wherein the positioning step includes the step of clicking the pointing device so the alphanumeric character is capitalized.

5. A method as described in claim 4 including after the step d), the step of lifting the pointing device off of the surface to encode a space.

* * * * *